United States Patent
Watanabe et al.

(10) Patent No.: US 7,037,831 B2
(45) Date of Patent: May 2, 2006

(54) METHOD OF PRODUCTION OF MULTILAYER CERAMIC ELECTRONIC DEVICE

(75) Inventors: Yasuo Watanabe, Chuo-ku (JP); Kenta Endoh, Nikaho-machi (JP); Wataru Takahara, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/972,439

(22) Filed: Oct. 26, 2004

(65) Prior Publication Data

US 2005/0095851 A1    May 5, 2005

(30) Foreign Application Priority Data

Oct. 31, 2003  (JP)  ............................. 2003-373494
Jan. 29, 2004  (JP)  ............................. 2004-021582

(51) Int. Cl.
    *H01L 21/44*    (2006.01)
(52) U.S. Cl. .................. 438/660; 438/663; 438/662
(58) Field of Classification Search .............. 438/660, 438/652, 662, 663
    See application file for complete search history.

(56) References Cited

U.S. PATENT DOCUMENTS 5,336,532 A * 8/1994 Haluska et al. .............. 427/515
6,510,040 B1 * 1/2003 Sato et al. ............... 361/321.4

FOREIGN PATENT DOCUMENTS

JP    A 08-008137    1/1996
JP    A 2002-080279    3/2002

* cited by examiner

*Primary Examiner*—David Nhu
(74) *Attorney, Agent, or Firm*—Oliff & Berridge, PLC (57) ABSTRACT

A method of production of a multilayer ceramic capacitor or other multilayer ceramic electronic device with few structural defects and improved highly accelerated life, that is, a method of production of a multilayer ceramic electronic device having a firing step of firing a stack comprised of a dielectric layer paste and an internal electrode layer paste including a base metal alternately arranged in a plurality of layers, a first annealing step of annealing, at a temperature T1 of 600 to 900° C., the stack after firing and a second annealing step of annealing, at a temperature T2 of 900 to 1200° C. (however, excluding 900° C.), the stack after said first annealing.

14 Claims, 4 Drawing Sheets

METHOD OF PRODUCTION OF MULTILAYER CERAMIC ELECTRONIC DEVICE

BACKGROUND OF THE INVENTION

1. Field of the Invention

The present invention relates to a method of production of a multilayer ceramic capacitor or other multilayer ceramic electronic device.

2. Description of the Related Art

In recent years, as the material for internal electrode layers used in a multilayer ceramic capacitor, a typical example of a multilayer ceramic electronic device, it has become possible to use nickel and other inexpensive base metals instead of platinum, palladium, and other expensive precious metals. Major reductions in cost have been realized.

However, for suitable metallization of internal electrode layers using base metals, the green chip has to be fired in a reducing atmosphere. To give the dielectric materials resistance to reduction in firing in a reducing atmosphere, sometimes Mn is added to the dielectric layers contained in the green chips. Further, to enable reoxidation of the dielectric layers in the sintered body after firing in a reducing atmosphere, the sintered body is sometimes annealed.

In the past, when adding Mn to the dielectric layers, the sintered body obtained by firing a green chip containing the dielectric layers had to be suitably annealed or else MnO would segregate (precipitate) in the vicinity or at the ends of the internal electrode layers—resulting in problems such as structural defects or disconnects of internal electrode layers. That is, if annealing was not suitably performed, it became a cause of a drop in the yield, reliability, etc. of the capacitors.

In the past, after firing the green chip, the practice had been to anneal the obtained sintered body just once at a holding temperature of for example about 1000 to 1200° C. (see Patent Publication 1: Japanese Patent Publication (A) No. 2002-80279 and Patent Publication 2: Japanese Patent Publication (A) No. H08-8137).

However, with a single annealing, if the holding temperature is too low, there is a tendency for the reoxidation of the dielectric layers to become insufficient, the insulation resistance to deteriorate, and the accelerated life (highly accelerated life test value) to also become shorter. Conversely, if the holding temperature is too high, the reoxidation of the dielectric layers is performed well, but even the internal electrode layers end up being oxidized and therefore not only does the capacity fall, but also there is tendency for the dielectric base material to end up being reacted with and the capacity-temperature characteristic, insulation resistance, and accelerated life to deteriorate.

That is, with just a single annealing, optimization of the stabilization (holding) temperature and time was difficult.

SUMMARY OF THE INVENTION

An object of the present invention is to provide a method of production of a multilayer ceramic capacitor or other multilayer ceramic electronic device with few structural defects and improved highly accelerated life test value.

The inventors discovered that by performing annealing after firing step by step a plurality of times, the object of the present invention can be achieved and thereby completed the present invention.

That is, according to the present invention, there is provided a method of production of a multilayer ceramic electronic device comprising a firing step of firing a stack comprised of a dielectric layer paste and an internal electrode layer paste including a base metal alternately arranged in a plurality of layers, a first annealing step of annealing, at a temperature T1, the stack after firing and a second annealing step of annealing, at a temperature T2 higher than the temperature T1, the stack after the first annealing.

According to the present invention, there is also provided a method of production of a multilayer ceramic electronic device comprising a firing step of firing a stack comprised of a dielectric layer paste and an internal electrode layer paste including a base metal alternately arranged in a plurality of layers, a first annealing step of annealing, at a temperature T1 of 600 to 900° C., the stack after firing and a second annealing step of annealing, at a temperature T2 of 900 to 1200° C. (however, excluding 900° C.), the stack after the first annealing.

Preferably, the difference (T2−T1) between T2 and T1 is at least 50° C.

In the present invention, the first annealing step and second annealing step may be performed consecutively after the firing step or may be performed independently from the firing step.

Examples of performing them consecutively are as follows: For example, an atmospheric temperature of a temperature reducing process of the firing step for lowering the atmospheric temperature from a firing holding temperature is lowered to a temperature the same as the temperature T1, the first annealing step is performed, then the second annealing step is performed. Alternatively, an atmospheric temperature of a temperature reducing process of the firing step is lowered to a temperature lower than the temperature T1 and higher than room temperature, then the atmospheric temperature is raised, the first annealing step is performed, then the second annealing step is performed.

An example of performing them independently is as follows: For example, after a temperature lowering step of the firing step, the atmospheric temperature is raised, the first annealing step is performed, then the second annealing step is performed.

Preferably, the first annealing step is performed at an oxygen partial pressure of $10^{-7}$ to 0.1 Pa and the second annealing step is performed at an oxygen partial pressure of $10^{-15}$ to 10 Pa.

Preferably, a dielectric layer paste having a main ingredient material including a dielectric oxide of a composition of $\{(Sr_{1-x}Ca_x)O\}_m \cdot (Ti_{1-y}Zr_y)O_2$, where $0 \leq x \leq 1.00$, $0 \leq y \leq 1.00$, and $0.75 \leq m \leq 1.3$, and a secondary ingredient material including Mn is used.

Preferably, a dielectric layer paste having a main ingredient material including a dielectric oxide of a composition of $\{(Sr_{1-x}Ca_x)O\}_m \cdot (Ti_{1-y}Zr_y)O_2$, where $0 \leq x \leq 1.00$, $0 \leq y \leq 0.20$, and $0.94 < m < 1.02$ and a secondary ingredient material including an oxide of Mn of a content, with respect to 100 moles of the main ingredient material, of less than 4 moles converted to Mn in the oxide, an oxide of rare earth elements comprised of Sc, Y, and a lanthanoid of a content, with respect to 100 moles of the main ingredient material, of 0.02 to 2 moles (however, excluding 2 moles) converted to rare earth elements, at least one oxide selected from oxides of V, Nb, W, Ta, and Mo of a content, with respect to 100 moles of the main ingredient material, of 0.01 to 2 moles (however, excluding 2 moles), and at least one of $SiO_2$, MO (where M is at least one type of element selected from Ba, Ca, Sr, and Mg), $Li_2O$, and $B_2O_3$ of a content, with respect to 100 moles of the main ingredient material, of 0 to 15 moles (however, excluding 0 mole and 15 moles) is used.

Preferably, a dielectric layer paste having a main ingredient material including a dielectric oxide of a composition of $[(Ca_xSr_{1-x})O]_m[(Ti_yZr_{1-y})O_2]$, where $0 \leq x \leq 1$, $0 \leq y \leq 0.10$, and $0.75 \leq m \leq 1.04$ and a secondary ingredient material including an oxide of Mn of a content, with respect to 100 moles of the main ingredient material, of 0.2 to 5 moles converted to MnO, an oxide of Al of a content, with respect to 100 moles of the main ingredient material, of 0.1 to 10 moles converted to $Al_2O_3$, a composite oxide including a composite oxide expressed by $[(Ba_zCa_{1-z})O]_vSiO_2$, where $0 \leq z \leq 1$ and $0.5 \leq v \leq 4.0$, and of a content, with respect to 100 moles of the main ingredient material, of 0.5 to 15 moles, and at least one oxide selected from oxides of a rare earth element, Nb, Mo, Ta, and W of a content, with respect to 100 moles of the main ingredient material, of 0.02 to 1.5 moles, is used.

Preferably, a dielectric layer paste having a main ingredient material including a dielectric oxide of a composition of $\{(Ca_{1-x}Me_x)O\}_m \cdot (Zr_{1-y}Ti_y)O_2$, where Me is at least one of Sr, Mg, and Ba and $0 \leq x \leq 1.00$, $0.1 \leq y \leq 0.8$, and $0.8 \leq m \leq 1.3$ and a secondary ingredient material including an oxide of V of a content, with respect to 100 moles of the main ingredient material, of 0 to 7 moles (however, excluding 0 mole and 7 moles) converted to $V_2O_5$, an oxide of Al of a content, with respect to 100 moles of the main ingredient material, of 0 to 15 moles (however, excluding 0 mole and 15 moles) converted to $Al_2O_3$, an oxide of Mn of a content, with respect to 100 moles of the main ingredient material, of 0 to 5 moles (however, excluding 0 mole and 5 moles) converted to Mn, at least one compound selected from $SiO_2$, MO (where M is at least one type of element selected from Ba, Ca, Sr, and Mg), $Li_2O$, and $B_2O_3$ of a content, with respect to 100 moles of the main ingredient material, of 0 to 20 moles (however, excluding 0 mole and 20 moles), and an oxide of a rare earth element is used.

According to the present invention, as the means for optimizing the annealing conditions, annealing is performed stepwise a plurality of times. Due to this, the poor conduction and other structural defects due to segregation and precipitation of Mn which had occurred in the past at the vicinity and ends of the internal electrode layers are suppressed. As a result, there is also no longer any disconnects of the internal electrode layers due to these structural defects and the coverage-rate of the internal electrode layers is raised and contributes to an improvement of the capacity (or prevention of a drop).

Further, the insulation resistance and accelerated life (highly accelerated life test value) of the obtained multilayer ceramic capacitor or other multilayer ceramic electronic device are improved.

The multilayer ceramic electronic device is not particularly limited, but a multilayer ceramic capacitor, piezoelectric stack device, chip varistor, chip thermistor, or other surface mounted (SMD) chip type electronic device may be mentioned.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
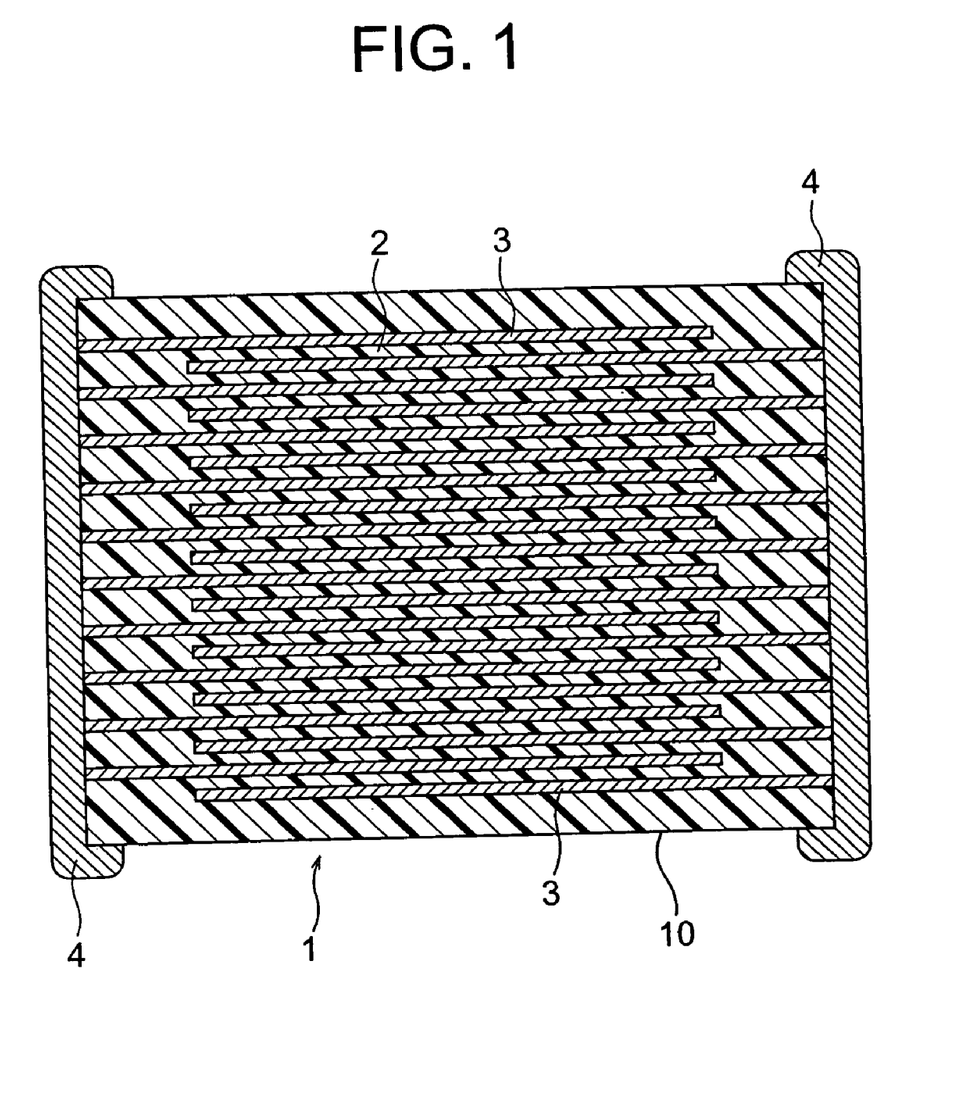
FIG. 1 is a sectional view of a multilayer ceramic capacitor according to an embodiment of the present invention.

As shown in FIG. 1, a multilayer ceramic capacitor 1 serving as one example of a multilayer ceramic electronic device produced by the method of the present invention has a capacitor device body 10 comprised of pluralities of dielectric layers 2 and internal electrode layers 3 alternately arranged. The two ends of the capacitor device body 10 are formed with a pair of external electrodes 4 connecting with the alternately arranged plurality of internal electrode layers 3 in the device body 10.

The internal electrode layers 3 are stacked so as to be alternately exposed at the surfaces of the two facing ends of the capacitor device body 10. The pair of external electrodes 4 are formed at the two ends of the capacitor device body 10 and connected to the exposed ends of the alternately arranged internal electrode layers 3 to form a capacitor circuit.

The shape and size of the multilayer ceramic capacitor 1 may be suitably determined in accordance with the object or application. When the capacitor 1 is a rectangular parallelopiped, the size is usually about 0.6 to 3.2 mm×0.3 to 1.6 mm×0.1 to 1.2 mm.

The composition of the dielectric layers 2 is not particularly limited in the present invention, but the layers may be comprised of for example the following dielectric ceramic composition. The dielectric ceramic composition of this embodiment has a main ingredient including for example calcium titanate, strontium titanate, and/or barium titanate and preferably has reduction resistance.

The dielectric ceramic composition of the present embodiment includes, in addition to the above main ingredient, an oxide of Mn as a secondary ingredient. This is to impart reduction resistance. In addition to the oxide of Mn, as a secondary ingredient, at least one oxide selected from oxides of Sr, Y, Gd, Tb, Dy, V, Mo, Zn, Cd, Ti, Sn, W, Ba, Ca, Mg, Cr, Si, and P may be contained.

As examples of the composition of the dielectric layers 2, for example the following may be mentioned.

First, as the main ingredient, a dielectric oxide of a composition of for example $\{(Sr_{1-x}CA_x)O\}_m \cdot (Ti_{1-y}Zr_y)O_2$ is used. In this case, normally $0 \leq x \leq 1.00$, preferably $0.30 \leq x \leq 0.50$, $0 \leq y \leq 0.20$, preferably $0 \leq y \leq 0.10$, and $0.94 < m < 1.02$, preferably $0.97 \leq m \leq 1.015$. For this main ingredient, as a secondary ingredient, preferably an oxide of rare earth elements comprised of Sc, Y, and a lanthanoid is contained. More preferably, the oxide of the rare earth elements is contained in an amount of 0.02 to 2 moles (however, excluding 2 moles) converted to rare earth elements with respect to 100 moles of the main ingredient material. Further, as secondary ingredients, at least one oxide selected from oxides of V, Nb, W, Ta, and Mo of a content, with respect to 100 moles of the main ingredient material, of 0.01 to 2 moles (however, excluding 2 moles), an oxide of Mn of a content, with respect to 100 moles of the main ingredient material, of less than 4 moles converted to metal element in the oxide, and at least one of $SiO_2$, MO (where M is at least one type of element selected from Ba, Ca, Sr, and Mg), $Li_2O$, and $B_2O_3$ of a content, with respect to 100 moles of the main ingredient material, of 0 to 15 moles (however, excluding 0 mole and 15 moles), may be contained.

Second, as the main ingredient, for example, a dielectric oxide of a composition of $[(Ca_xSr_{1-x})O]_m[(Ti_yZr_{1-y})O_2]$, is used. In this case, preferably $0 \leq x \leq 1$, $0 \leq y \leq 0.10$, and $0.75 \leq m \leq 1.04$. As secondary ingredient, an oxide of Mn of a content, with respect to 100 moles of the main ingredient, of 0.2 to 5 moles converted to MnO, an oxide of Al of a content of 0.1 to 10 moles converted to $Al_2O_3$, and a composite oxide expressed by $[(Ba_zCa_{1-z})O]_vSiO_2$, where $0 \leq z \leq 1$ and $0.5 \leq v \leq 4.0$, and of a content of 0.5 to 15 moles are preferably contained. Further, as a secondary ingredient, at least one oxide selected from oxides of a rare earth element, Nb, Mo, Ta, and W of a content, with respect to 100 moles of the main ingredient, of 0.02 to 1.5 moles may be contained.

Third, as the main ingredient, for example, a dielectric oxide of a composition of $\{(Ca_{1-x}Me_x)O\}_m \cdot (Zr_{1-y}Ti_y)O_2$, where Me is at least one of Sr, Mg, and Ba, is used. In this case, $0 \leq x \leq 1.00$, preferably $0.1 \leq y \leq 0.8$, and normally $0.8 \leq m \leq 1.3$, preferably $0.970 \leq m \leq 1.030$. With respect to this main ingredient, as a secondary ingredient, an oxide of V and an oxide of Al are preferably contained. More preferably, an oxide of V of a content, with respect to 100 moles of the main ingredient, of 0 to 7 moles (however, excluding 0 mole and 7 moles) converted to $V_2O_5$ and an oxide of Al of a content of 0 to 15 moles (however, excluding 0 mole and 15 moles) converted to $Al_2O_3$ are contained. Further, as secondary ingredients, an oxide of Mn of a content, with respect to 100 moles of the main ingredient material, of 0 to 5 moles (however, excluding 0 mole and 5 moles) converted to Mn element in the oxide, at least one compound selected from $SiO_2$, MO (where M is at least one type of element selected from Ba, Ca, Sr, and Mg), $Li_2O$, and $B_2O_3$ of a content, with respect to 100 moles of the main ingredient material, of 0 to 20 moles (however, excluding 0 mole and 20 moles), and an oxide of a rare earth element may be contained.

However, in the present invention, the composition of the dielectric layers 2 is not limited to the above.

The thickness of the dielectric layers 2 is preferably not more than 30 μm in the present embodiment. The number of the dielectric layers 2 stacked is not particularly limited in the present invention. For example, a small number of about 10 layers may be stacked or a large number of preferably 50 layers or more, more preferably 100 layers or more, still more preferably 300 layers or more, may be stacked.

The conductor material included in the internal electrode layers 3 may be an inexpensive base metal. As the base metal, nickel or a nickel alloy is preferable. The content of nickel in the alloy is preferably at least 90 wt %. Note that the nickel or nickel alloy may also contain trace amounts of phosphorus, iron, magnesium, and other elements in amounts of not more than about 0.1 wt %. The thickness of the internal electrode layers 3 is made not more than 2 μm in the present invention.

The material of the external electrodes 4 is not particularly limited, but usually copper or a copper alloy, nickel or a nickel alloy, etc. is used. It is however also possible to use silver or a silver and palladium alloy. The thickness of the external electrodes 4 is also not particularly limited, but normally is 10 to 50 μm or so.

Next, an example of the method of production of a multilayer ceramic capacitor 1 according to the present embodiment will be explained.

(1) First, a dielectric layer paste for forming the dielectric layers 2 shown in FIG. 1 after firing and an internal electrode layer paste for forming the internal electrode layers 3 shown in FIG. 1 after firing are prepared. Further, an external electrode paste is also prepared.

The dielectric layer paste may be an organic coating comprised of a dielectric material and organic vehicle kneaded together or a water-based coating.

As the dielectric material, it is possible to use one obtained by suitably selecting and mixing various types of compounds forming composite oxides or oxides such as carbonates, nitrates, hydroxides, and organic metal compounds.

The organic vehicle is a binder dissolved in an organic solvent. The binder used for the organic vehicle is not particularly limited and may be suitably selected from ordinary binders such as ethyl cellulose, polyvinyl butyral, etc. Further, the organic solvent used at this time is also not particularly limited and may be suitably selected from organic solvents such as terpineol, butyl carbitol, acetone, toluene, etc. in accordance with the method of use such as the printing or sheet method.

Further, the water-based coating means water in which a water-soluble binder, dispersant, etc. are dissolved. The water-soluble binder is not particularly limited and may be suitably selected from polyvinyl alcohol, cellulose, a water-soluble acrylic resin, an emulsion, etc.

The internal electrode layer paste is prepared by kneading conductive materials comprised of the above-mentioned various conductive metals or their alloys or various oxides forming the above conductive materials after firing, organic metal compounds, resinates, etc. with the above organic vehicle.

The external electrode paste is prepared in the same way as the internal electrode layer paste.

The content of the organic vehicle in each paste is not particularly limited, but the usual content should be about 1 to 5 wt % of binder and 10 to 50 wt % of solvent. Further, it is also possible to include in the pastes various types of additives selected from dispersants, plasticizers, dielectrics, insulators, etc. in accordance with need.

(2) Next, a green chip is prepared using the dielectric layer paste and internal electrode layer paste. When using the printing method, the dielectric layer paste and predetermined patterns of the internal electrode layer paste are successively printed on a carrier sheet, the sheet is cut to a predetermined shape, then the assembly is peeled off from the carrier sheet to obtain a green chip. When using the sheet method, dielectric layer paste is formed to a predetermined thickness of a carrier sheet to form a green sheet, an internal electrode layer paste is printed on this by a predetermined pattern, then these are stacked to obtain a green chip.

(3) Next, the binder is removed from the obtained green chip. The binder is removed by raising the atmospheric temperature from for example room temperature (25° C.) toward the binder removal holding temperature by a predetermined temperature raising speed, holding the temperature at the holding temperature for a predetermined time, then lowering the temperature by a predetermined temperature lowering speed.

In this embodiment, the temperature raising speed is preferably 5 to 300° C./hour, more preferably 10 to 100° C./hour. The binder removal holding temperature is preferably 200 to 400° C., more preferably 250 to 350° C. The holding time of the holding temperature is preferably 0.5 to 24 hours, more preferably 2 to 20 hours. The temperature lowering speed is preferably 25 to 500° C./hour, more preferably 50 to 300° C./hour.

The processing atmosphere of the binder removal is preferably air or a reducing atmosphere. As the atmospheric gas in the reducing atmosphere, for example a moistened mixed gas of $N_2$ and $H_2$ is preferably used. If the reduction is too strong, the binder removal effect tends to drop.

(4) Next, the green chip after binder removal is fired. The firing is performed by raising the atmospheric temperature from for example room temperature (25° C.) toward the firing holding temperature by a predetermined temperature raising speed, holding the temperature at the holding temperature for a predetermined time, then lowering the atmospheric temperature at a predetermined temperature lowering speed.

In this embodiment, the temperature raising speed is preferably 50 to 500° C./hour, more preferably 100 to 300° C./hour. The firing holding temperature is preferably 1200 to 1350° C., more preferably 1200 to 1320° C., while the holding time of the holding temperature is preferably 0.5 to 8 hours, more preferably 1 to 3 hours. If the firing holding temperature is too low, densification becomes insufficient even if the holding time of the holding temperature is made longer, while if too high, disconnects of the electrodes due to abnormal sintering in the internal electrode layers, deterioration of the capacity-temperature characteristic due to diffusion of the conductor material forming the internal electrode layers, or reduction of the dielectric ceramic composition forming the dielectric layers easily occurs. The temperature lowering speed is preferably 50 to 500° C./hour, more preferably 200 to 300° C./hour.

In this embodiment, the firing is performed in a reducing atmosphere. As the atmospheric gas in the reducing atmosphere, for example a moistened mixed gas of $N_2$ and $H_2$ is preferably used. In particular, at the time of firing, it is preferable to raise the temperature until the holding temperature at the time of binder removal under an $N_2$ gas or moistened $N_2$ gas atmosphere, then change the atmosphere and further continue the temperature elevation and preferable to cool to the first annealing holding temperature T1, then again change to an $N_2$ gas or moistened $N_2$ gas atmosphere and continue the cooling. The oxygen partial pressure in the firing atmosphere is preferably $6 \times 10^{-8}$ to $10^{-4}$ Pa. If the oxygen partial pressure is too low, abnormal sintering of the conductor material of the internal electrode layers will occur and it will sometimes end up disconnecting, while if too high, the internal electrode layers will tend to oxidize.

(5) Next, the chip sintered body after firing is subjected to annealing (heat treatment). The annealing is processing for reoxidizing the dielectric layers.

In this embodiment, the characterizing feature is performing the annealing stepwise two times. That is, in this embodiment, the annealing is comprised of a first annealing step and a second annealing step.

First, as the first step, the chip sintered body after firing is subjected to first annealing (first annealing step). This step mainly functions to suppress segregation and precipitation of Mn.

Figure 2:
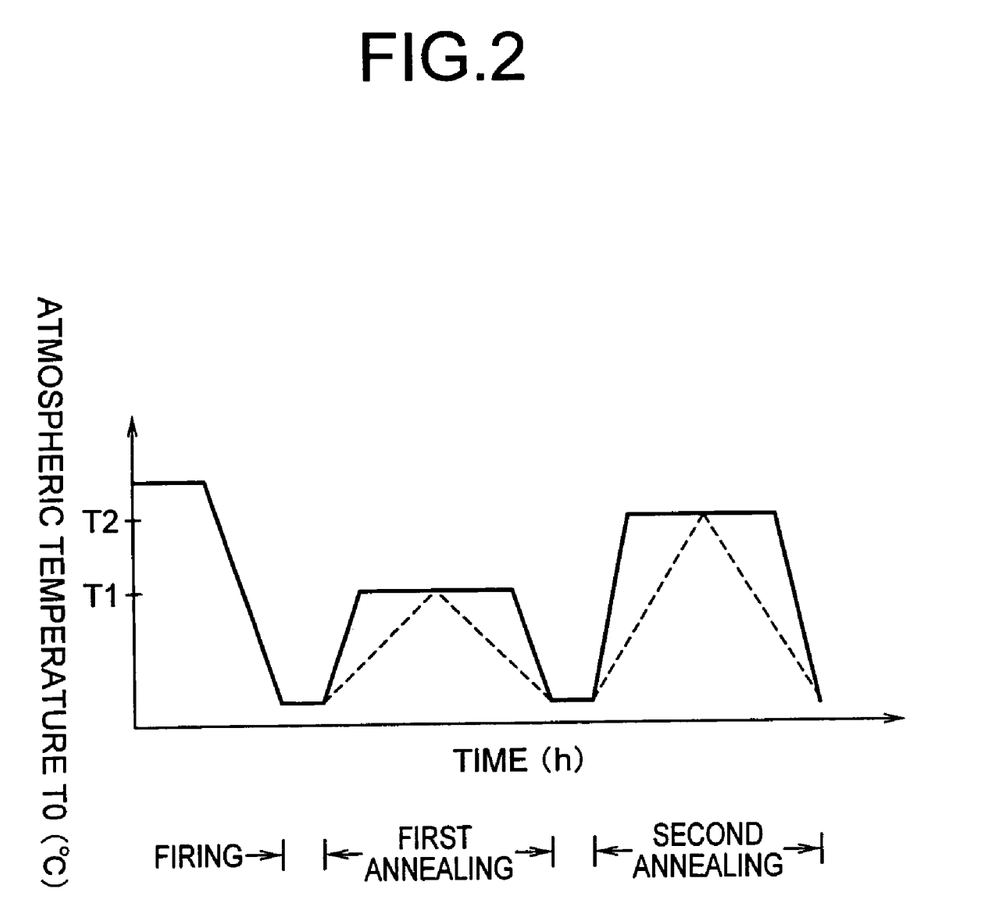
FIG. 2 to FIG. 4 are graphs of temperature changes of firing, first annealing, and second annealing according to an embodiment of the present invention.

The first annealing step is a step of raising the atmospheric temperature T0, for example as shown in FIG. 2, from for example room temperature (25° C.) toward the first annealing holding temperature T1 by a predetermined temperature raising speed, holding the temperature at T1 for a predetermined time, then lowering the temperature by a predetermined temperature lowering speed.

In this embodiment, the temperature raising speed is preferably 50 to 500° C./hour, more preferably 100 to 300° C./hour. If the temperature raising speed is too fast, structural defects (cracks) tend to occur, while if too slow, poor conduction due to segregation of Mn tends to occur.

The first annealing holding temperature T1 is preferably 600 to 900° C., more preferably 650 to 900° C. The holding time of T1 is preferably not more than 6 hours, more preferably 2 to 5 hours. If T1 is too low, the accelerated life (highly accelerated test life value) of the obtained capacitor tends to deteriorate and the reliability to fall. If too high, poor conduction of the obtained capacitor tends to occur. If the holding time of T1 is too long, poor conduction tends to occur in the obtained capacitor. The temperature lowering speed is preferably 50 to 500° C./hours, more preferably 100 to 300° C./hour.

The processing atmosphere of the first annealing is preferably a neutral atmosphere. As the atmospheric gas in the neutral atmosphere, for example, moistened $N_2$ gas is preferably used. At the time of the annealing, after raising the atmospheric temperature to the first annealing holding temperature T1 in a $N_2$ gas atmosphere, the atmosphere may be changed or the entire process of the first annealing may be performed in a moistened $N_2$ gas atmosphere. The oxygen partial pressure $PO_2$ in the first annealing atmosphere is preferably $10^{-7}$ to 0.1 Pa. If the oxygen partial pressure is too low, the insulation resistance of the condenser tends to fall and the life to deteriorate, while if too high, poor conduction is liable to occur in the capacitor.

In the first annealing step, it is also possible to shift to the later explained second annealing step after the temperature raising process and temperature holding process without intervention of a temperature lowering process.

Next, as a second step, the chip sintered body after the first annealing is subjected to second annealing (second annealing step). This step corresponds to the conventionally performed annealing and mainly functions to reoxidize the dielectric layer 2. By this second annealing, a condenser device body 10 comprised of a sintered body is formed.

The second annealing is the step of raising the atmospheric temperature T0, for example, as shown in FIG. 2, from for example room temperature (25° C.) toward the second annealing holding temperature T2 by a predetermined temperature raising speed, holding the temperature at T2 for a predetermined time, then lowering the temperature by a predetermined temperature lowering speed.

In this embodiment, the temperature raising speed is preferably 50 to 500° C./hour, more preferably 100 to 300° C./hour. If the temperature raising speed is too fast, structural defects (cracks) tend to occur in the obtained capacitor, while if too slow, Mn tends to segregate and poor conduction to occur.

The second annealing holding temperature T2 is preferably 900 to 1200° C. (however, excluding 900° C.), more preferably 950 to 1200° C. The holding time of T2 is preferably not more than 6 hours, more preferably 2 to 5 hours. If T2 is too low, the accelerated life (highly accelerated life test value) of the insulation resistance of the obtained capacitor will deteriorate and the reliability will tend to fall, while if too high, poor conduction tends to occur in the obtained capacitor. In particular, T2 is preferably set to at least 50° C, more preferably at least 100° C., higher than the temperature T1. That is, the difference between T2 and T1 (T2−T1) is preferably at least 50° C., more preferably at least 100° C. By making the difference of T1 and T2 this extent, the effect obtained by the present invention becomes more remarkable. If the holding temperature of T2 is too long, poor conduction is liable to occur in the capacitor. The temperature lowering speed is preferably 50 to 500° C./hour, more preferably 100 to 300° C./hour.

The processing atmosphere of the second annealing is preferably a neutral atmosphere. As the atmospheric gas in the neutral atmosphere, for example, moistened $N_2$ gas is preferably used. At the time of the second annealing, after raising the atmospheric temperature to the second annealing holding temperature T2 in a $N_2$ gas atmosphere, the atmosphere may be changed or the entire process of the second annealing may be performed in a moistened $N_2$ gas atmosphere. The oxygen partial pressure $PO_2$ in the second annealing atmosphere is preferably $10^{-5}$ to 10 Pa. If the oxygen partial pressure is too low, the life of the condenser deteriorates, while if too high, poor conductions are liable to occur in the capacitor.

The above first annealing and/or second annealing may also be comprised of just a temperature raising process and temperature lowering process as shown in FIG. 2 with dotted lines. That is, it is possible to make the temperature holding time zero or not provide the temperature holding process. In this case, the first and second annealing holding temperatures T1 to 2 are synonymous with the maximum temperature.

Figure 3:
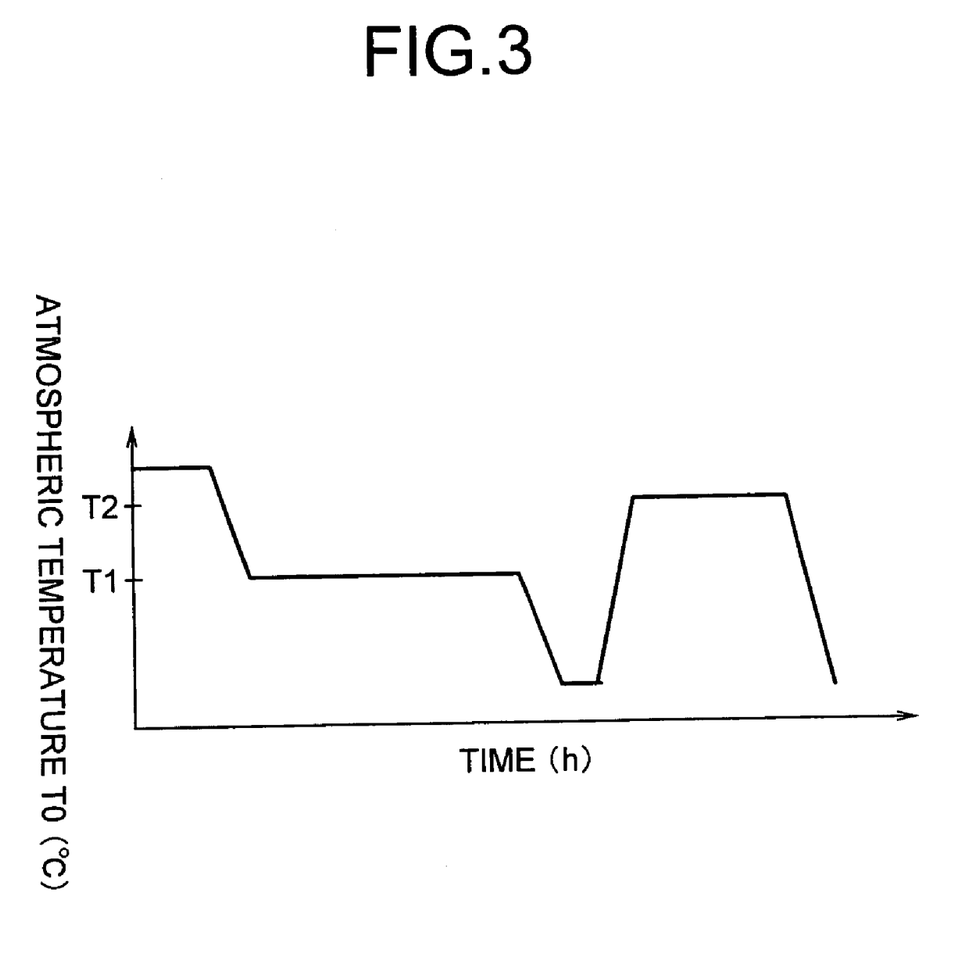

In the above firing step, it is also possible to lower the atmospheric temperature of the temperature lowering process of the firing step to a temperature the same as the temperature T1 and perform the first annealing step and then perform the second annealing step (see FIG. 3). That is, it is also possible to perform the first annealing step and second annealing step consecutively after the firing step.

Figure 4:
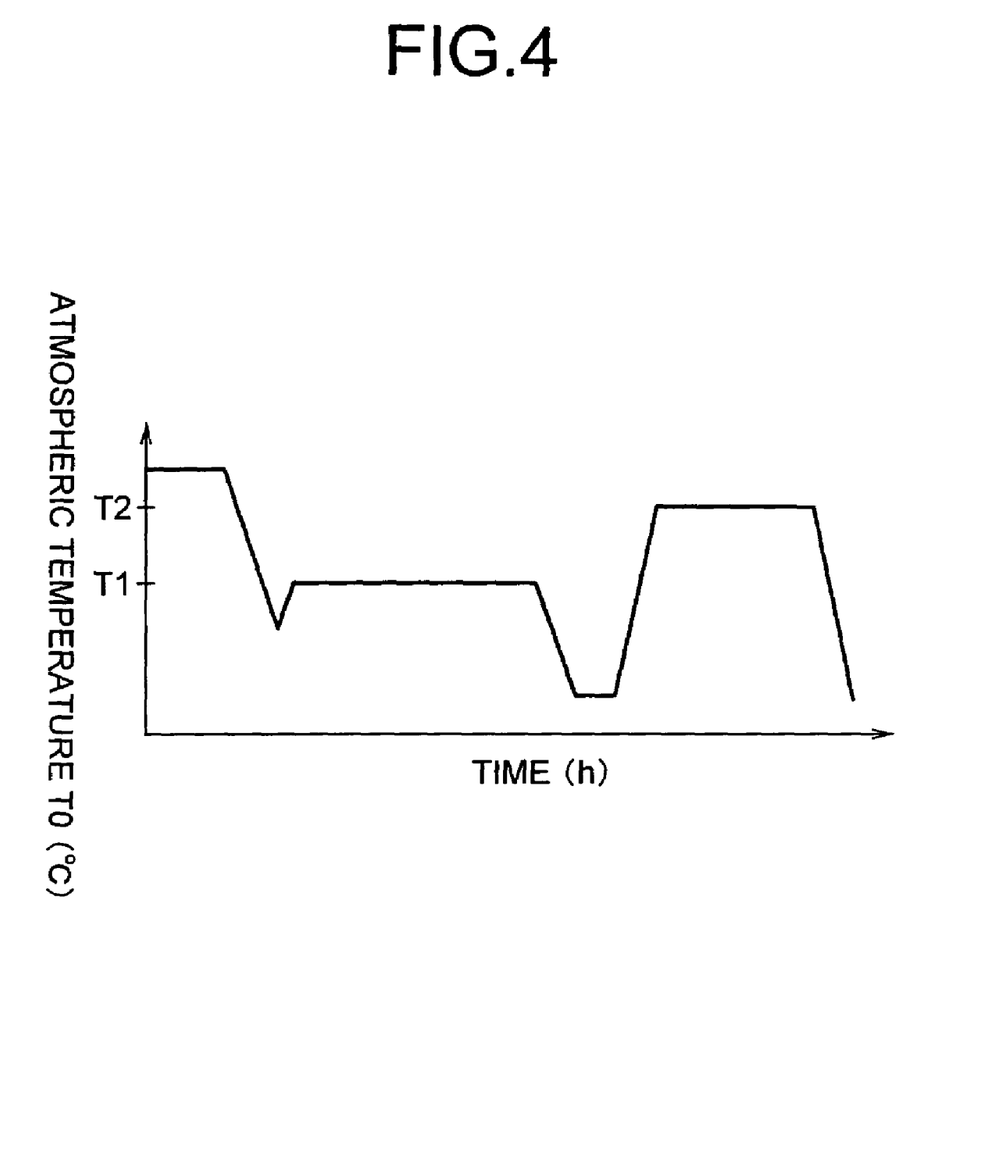

Further, in the above firing step, it is also possible to lower the atmospheric temperature of the temperature lowering process of the firing step to a temperature lower than the temperature T1 and higher than room temperature (for example, 100 to 500° C. or so), then raise the atmospheric temperature and perform the first annealing step and then perform the second annealing step (see FIG. 4). That is, it is also possible to perform the first annealing step and the second annealing step consecutively after the firing step.

Note that in the above binder removal, firing, and annealing, it is possible to use for example a wetter to moisturize the $N_2$ gas or mixed gas. In this case, the water temperature is preferably 0 to 75° C. or so.

(6) Next, the obtained capacitor device body 10 is polished at its end faces by for example barrel polishing or sandblasting, then external electrode paste is printed or transferred on to them and fired to form the external electrodes 4. Due to this, a multilayer ceramic capacitor 1 is obtained. The firing conditions of the external electrode paste are preferably firing in for example a moisturized mixed gas of N2 and $H_2$ at 600 to 800° C. for 10 minutes to 1 hour or so. Further, in accordance with need, the surfaces of the external electrodes 4 are formed with covering layers by plating etc.

The obtained multilayer ceramic capacitor 1 is mounted on a printed circuit board by soldering etc. and used for various types of electronic equipment etc.

Above, embodiments of the present invention were explained, but the present invention is not limited to these embodiments in any way. The present invention may be worked in various forms within a range not exceeding its gist of course.

For example, in the above embodiments, a multilayer ceramic capacitor 1 was illustrated as the multilayer ceramic electronic device, but the invention is not limited to this and may also be applied to any device having specific dielectric layers.

Further, in the above embodiments, the binder removal step, firing, and annealings were performed independently, but the present invention is not limited to this. It is also possible to perform two or more steps successively. When performing them successively, it is preferable to remove the binder, then change the atmosphere without cooling, then raise the temperature to the firing holding temperature and perform the firing, then cool and, when the first annealing holding temperature T1 is reached, change the atmosphere and perform the annealing.

EXAMPLES

Next, the present invention will be explained in more detail by giving examples further specifying the embodiments of the present invention. However, the present invention is not limited to just these embodiments.

The routine shown below was used to prepare samples of multilayer ceramic capacitors.

Preparation of Pastes

First, the dielectric layer paste was prepared as follows:

As the starting materials for preparing the dielectric material, main ingredient materials ($SrCO_3$, $CaCO_3$, $TiO_2$, and $ZrO_2$) and secondary ingredient materials ($V_2O_5$, $Al_2O_3$, $MnCO_3$, $BaCO_3$, $CaCO_3$, $SiO_2$, etc.) having average particle sizes of 0.1 to 1 μm were prepared.

Next, the main ingredient materials and the secondary ingredient materials were weighed and mixed so that the compositions after firing had the following ratios of composition and then dried to obtain the dielectric materials.

In Samples 1 to 3, they were mixed to give 100 moles of $\{(Ca_{0.6}Sr_{0.4})O\}.(Zr_{0.1}Ti_{0.9})O_2$+0.1 mole of $V_2O_5$+1 mole of MnO+2 moles of ($SiO_2$+CaO)+0.5 mole of $Y_2O_3$.

In Samples 4 to 6 and Samples 10 to 29, they were mixed to give 100 moles of $\{(Ca_{0.6}Sr_{0.4})O\}.(Zr_{0.5}Ti_{0.5})O_2$+0.1 mole of $V_2O_5$+0.5 mole of $Al_2O_3$+1 mole of MnO+2 moles of $(Ba_{0.6}Ca_{0.4})SiO_3$ (referred to as "BCG")

In Samples 7 to 9, they were mixed to give 100 moles of $\{(Ca_{0.6}Sr_{0.4})O\}.(Zr_{0.9}Ti_{0.1})O_2$+0.3 mole of $Al_2O_3$+1 mole of MnO+2.5 moles of BCG.

Note that BCG was produced by wet mixing $BaCO_3$, $CaCO_3$, and $SiO_2$ by a ball mill for 16 hours, drying the result, then firing it at 1000 to 1300° C. in the air, then wet pulverizing the result by a ball mill for 100 hours.

100 parts by weight of the obtained dielectric material, 4.8 parts by weight of an acrylic resin, 40 parts by weight of methylene chloride, 20 parts by weight of trichloroethane, 6 parts by weight of mineral spirits, and 4 parts by weight of acetone were mixed by a ball mill to obtain a paste.

Next, the internal electrode layer paste was prepared as follows: 100 parts by weight of Ni particles having an average particle size of 0.3 μm, 40 parts by weight of an organic vehicle (8 parts by weight of ethyl cellulose resin dissolved in 92 parts by weight of butyl carbitol), and 10 parts by weight of butyl carbitol were kneaded by a triple roll to obtain a paste.

Next, the external electrode paste was prepared as follows: 100 parts by weight of Cu particles having an average particle size of 0.5 μm, 35 parts by weight of an organic vehicle (8 parts by weight of ethyl cellulose resin dissolved in 92 parts by weight of butyl carbitol), and 7 parts by weight of butyl carbitol were kneaded to obtain a paste.

Preparation of Green Chip

Next, the above dielectric layer paste was used to for a green sheet of a thickness of 10 μm on a PET film, the internal electrode layer paste was printed on this by a predetermined pattern, then the green sheet was peeled off the PET film.

Next, green sheets and protective green sheets (where internal electrode layer paste was not printed) were stacked and pressed to obtain a green chip. The number of stacked layers of the sheets having the internal electrodes was made 100 layers.

Next, the green chip was cut to a predetermined size and subjected to a binder removal step, firing step, first annealing, and second annealing to obtain a multilayer ceramic fired body.

Binder Removal
  Temperature raising speed: 50° C./hour
  Holding temperature: 280° C.
  Holding time: 8 hours
  Atmosphere: air
  Temperature lowering speed: 50° C./hour
  Temperature lowering temperature: room temperature (25° C.)

Firing
  Temperature raising speed: 200° C./hour
  Holding temperature: 1250° C.
  Holding time: 2 hours
  Atmosphere: moisturized nitrogen and hydrogen mixed gas atmosphere ($H_2$: 5 vol %, oxygen partial pressure=$10^{-6}$ Pa)
  Temperature lowering speed: 300° C./hour
  Temperature lowering temperature: room temperature (25° C.)

First Annealing
  Temperature raising speed: 200° C./hour
  Holding temperature T1: see tables
  Holding time: 2 hours
  Atmosphere: moisturized nitrogen gas (oxygen partial pressure=$10^{-4}$ Pa)
  Temperature lowering speed: 200° C./hour
  Temperature lowering temperature: room temperature (25° C.)

Second Annealing
  Temperature raising speed: 200° C./hour
  Holding temperature T2: see tables
  Holding time: 2 hours
  Atmosphere: moisturized nitrogen gas (oxygen partial pressure=$10^{-3}$ Pa)
  Temperature lowering speed: 200° C./hour
  Temperature lowering temperature: room temperature (25° C.)

Note that for Sample 24, in the temperature lowering process of the first step, the temperature lowering process was ended at the point of time when the atmospheric temperature was lowered to T1, the first annealing step was entered, then the second annealing was performed (see FIG. 3).

For Sample 25, in the temperature lowering process of the first step, the temperature lowering process was ended at the point of time when the atmospheric temperature was lowered to the temperature 300° C. lower than T1 and higher than room temperature, then the atmospheric temperature was raised, the first annealing step was entered, then the second annealing was performed (see FIG. 4).

Note that for moisturerizing of the atmospheric gas at the time of firing, the first annealing, and second annealing, a wetter having a water temperature of 20° C. was used.

Next, the end faces of the multilayer ceramic fired body were polished by sand blasting, then external electrode paste was transferred to the end faces and fired in a moisturized mixed gas atmosphere of nitrogen gas and hydrogen gas at 800° C. for 10 minutes to form external electrodes, whereby a multilayer ceramic capacitor of the configuration shown in FIG. 1 was obtained.

The obtained capacitor sample had a size of 1.6 mm×0.8 mm×0.8 mm. The number of dielectric layers sandwiched between two internal electrode layers was 40, the thickness was 7 μm, and the thickness of the internal electrode layers was 1.2 μm Evaluation of Performance The highly accelerated life test value (HALT), the dielectric loss (tan δ), and structural defects (poor conduction rate) of the capacitor samples obtained were evaluated. The results are shown in Tables 1 to 2.

The highly accelerated life test value (HALT) was measured by holding a state of application of a DC voltage of 50V/μm at 200° C. to the capacitor sample. This highly accelerated life test value was evaluated by measuring the average life for 10 capacitor samples. For this evaluation, the highly accelerated life test value is particularly important when making the dielectric layers thinner. The time from when the resistance falls by one order from the start of application is defined as the life. 1000 hours or more was judged as good.

The dielectric loss (tan δ, unit %) was measured for the capacitor samples at a reference temperature of 25° C. by a digital LCR meter (4274A made by Yokogawa Hewlett Packard) under conditions of a frequency of 1 MHz and an input signal level (measurement voltage) of 1 Vrms. As evaluation, a tan δ of not more than 0.01% was considered good. Note that the value of tan δ is found from the average of the values measured using n (=10) number of samples of capacitors.

For the structural defects (poor conduction rate), first the capacitor samples were measured for electrostatic capacity for n=150 at a reference temperature of 25° C. by a digital LCR meter (4274A made by Yokogawa Hewlett Packard) under conditions of a frequency of 1 MHz and an input signal level (measurement voltage) of 1 Vrms. Samples lower in electrostatic capacity by at least 5% from the average of n=150 were buried in a resin and polished. Parts where the internal electrodes and external electrodes were not connected were judged as being structurally defectively parts (poor conduction parts). As evaluation, a defect rate of 0% was judged as good.

TABLE 1

| Sample | | 1st annealing T1 (° C.) | 1st annealing $PO_2$ (Pa) | 2nd annealing T2 (° C.) | 2nd annealing $PO_2$ (Pa) | Highly accelerated life (hr) | Tan δ (%) | Poor conduction rate (%) |
|---|---|---|---|---|---|---|---|---|
| 1 | Comp. Ex. | 700 | 1.0E−05 | — | — | 302 | 0.58 | 0 |
| 2 | Comp. Ex. | 1000 | 1.0E−01 | — | — | 1053 | 0.01 | 4.4 |

TABLE 1-continued

| Sample | | 1st annealing T1 (° C.) | 1st annealing PO$_2$ (Pa) | 2nd annealing T2 (° C.) | 2nd annealing PO$_2$ (Pa) | Highly accelerated life (hr) | Tan δ (%) | Poor conduction rate (%) |
|---|---|---|---|---|---|---|---|---|
| 3 | Ex. | 700 | 1.0E−05 | 1000 | 1.0E−01 | 1289 | 0.01 | 0 |
| 4 | Comp. Ex. | 700 | 1.0E−05 | — | — | 532 | 0.44 | 0 |
| 5 | Comp. Ex. | 1000 | 1.0E−01 | — | — | 1177 | 0.01 | 3.7 |
| 6 | Ex. | 700 | 1.0E−05 | 1000 | 1.0E−01 | 1350 | 0.01 | 0 |
| 7 | Comp. Ex. | 700 | 1.0E−05 | — | — | 719 | 0.31 | 0 |
| 8 | Comp. Ex. | 1000 | 1.0E−01 | — | — | 1245 | 0.01 | 3.1 |
| 9 | Ex. | 700 | 1.0E−05 | 1000 | 1.0E−01 | 1430 | 0.01 | 0 |

TABLE 2

| Sample | | 1st annealing T1 (° C.) | 1st annealing PO$_2$ (Pa) | 2nd annealing T2 (° C.) | 2nd annealing PO$_2$ (Pa) | Highly accelerated life (hr) | Tan δ (%) | Poor conduction rate (%) |
|---|---|---|---|---|---|---|---|---|
| 10 | Ref. Ex. | 500 | 1.0E−07 | 800 | 1.0E−04 | 787 | 0.33 | 0 |
| 11 | Ref. Ex. | 500 | 1.0E−07 | 1000 | 1.0E−01 | 1031 | 0.11 | 0 |
| 12 | Ref. Ex. | 500 | 1.0E−07 | 1300 | 1.0E+01 | 1398 | 0.01 | 5.4 |
| 13 | Ex. | 600 | 1.0E−06 | 1000 | 1.0E−01 | 1244 | 0.01 | 0 |
| 14 | Comp. Ex. | 700 | 1.0E−05 | 600 | 1.0E−06 | 693 | 0.24 | 0 |
| 15 | Ref. Ex. | 700 | 1.0E−05 | 800 | 1.0E−04 | 842 | 0.19 | 0 |
| 16 | Ex. | 700 | 1.0E−05 | 900 | 1.0E−02 | 1188 | 0.01 | 0 |
| 17 | Ex. | 700 | 1.0E−05 | 950 | 5.0E−02 | 1212 | 0.01 | 0 |
| 6 | Ex. | 700 | 1.0E−05 | 1000 | 1.0E−01 | 1350 | 0.01 | 0 |
| 18 | Ref. Ex. | 700 | 1.0E−05 | 1300 | 1.0E+01 | 1455 | 0.01 | 6.4 |
| 19 | Ex. | 900 | 1.0E−02 | 950 | 5.0E−02 | 1024 | 0.01 | 0 |
| 20 | Ex. | 900 | 1.0E−02 | 1000 | 1.0E−01 | 1384 | 0.01 | 0 |
| 21 | Comp. Ex. | 1300 | 1.0E+01 | 800 | 1.0E−04 | 1484 | 0.01 | 6.3 |
| 22 | Comp. Ex. | 1300 | 1.0E+01 | 1000 | 1.0E−01 | 1549 | 0.01 | 6.5 |
| 23 | Comp. Ex. | 1300 | 1.0E+01 | 1300 | 1.0E+01 | 1592 | 0.01 | 7.2 |
| 24 | Ex. | 700 | 1.0E−05 | 1000 | 1.0E−01 | 1050 | 0.01 | 0 |
| 25 | Ex. | 700 | 1.0E−05 | 1000 | 1.0E−01 | 1200 | 0.01 | 0 |

TABLE 3

| Sample | | 1st annealing T1 (° C.) | 1st annealing PO$_2$ (Pa) | 2nd annealing T2 (° C.) | 2nd annealing PO$_2$ (Pa) | Highly accelerated life (hr) | Tan δ (%) | Poor conduction rate (%) |
|---|---|---|---|---|---|---|---|---|
| 26 | Ref. Ex. | 600 | 1.0E−08 | 1000 | 1.0E−01 | 1003 | 0.01 | 3.5 |
| 6 | Ex. | 700 | 1.0E−05 | 1000 | 1.0E−01 | 1350 | 0.01 | 0 |
| 27 | Ref. Ex. | 900 | 9.8E+00 | 1000 | 1.0E−01 | 1438 | 0.01 | 5.3 |
| 28 | Ref. Ex. | 700 | 1.0E−05 | 900 | 1.0E−06 | 849 | 0.10 | 0 |
| 29 | Ref. Ex. | 700 | 1.0E−05 | 1200 | 9.8E+02 | 1321 | 0.01 | 1.9 |

As shown in Table 1, no matter what the composition of the dielectric layers, when performing the annealing treatment two times, the HALT value was high, the tan δ was low, and the poor conduction rate was 0% (Samples 3, 6, and 9). As opposed to this, when the annealing treatment was performed only once, it could be confirmed that there was a tendency for at least one of the HALT value, the tan δ, and the poor conduction rate to deteriorate.

As shown in Table 2, when the holding temperatures T1 to T2 of the first to second annealings are within the range of the present invention, the HALT value was high, the tan δ was low, and the poor conduction rate was 0% (Samples 13, 16, 17, 19, 20, 24, and 25). As opposed to this, when the holding temperatures T1 to T2 were outside the range of the present invention, it could be confirmed that there was a tendency for at least one of HALT value, the tan δ, and the poor conduction rate to deteriorate.

As shown in Table 3, even if the holding temperatures T1 to T2 of the first to second annealings are within the range of the present invention, by changing the processing atmosphere in the annealings (oxygen partial pressure), it is possible to have an effect on various characteristics.

The invention claimed is:

1. A method of production of a multilayer ceramic electronic device comprising a firing step of firing a stack comprised of a dielectric layer paste and an internal electrode layer paste including a base metal alternately arranged in a plurality of layers, a first annealing step of annealing, at a temperature T1, the stack after firing and a second annealing step of annealing, at a temperature T2 higher than the temperature T1, the stack after said first annealing.

2. The method of production of a multilayer ceramic electronic device as set forth in claim 1, wherein the difference (T2−T1) between T2 and T1 is at least 50° C.

3. The method of production of a multilayer ceramic electronic device as set forth in claim 1, wherein an atmospheric temperature of a temperature reducing process of the firing step where the atmospheric temperature is lowered from the firing holding temperature is lowered to a temperature the same as the temperature T1, the first annealing step is performed, then the second annealing step is performed.

4. The method of production of a multilayer ceramic electronic device as set forth in claim 1, wherein an atmospheric temperature of a temperature reducing process of the firing step where the atmospheric temperature is lowered from the firing holding temperature is lowered to a temperature lower than said temperature T1 and higher than room temperature, then the atmospheric temperature is raised, the first annealing step is performed, then the second annealing step is performed.

5. The method of production of a multilayer ceramic electronic device as set forth in claim 1, wherein after a temperature lowering step of the firing step where an atmospheric temperature is lowered from a firing holding temperature, the atmospheric temperature is raised, the first annealing step is performed, then the second annealing step is performed.

6. The method of production of a multilayer ceramic electronic device as set forth in claim 1, wherein the first annealing step is performed at an oxygen partial pressure of $10^{-7}$ to 0.1 Pa and the second annealing step is performed at an oxygen partial pressure of $10^{-5}$ to 10 Pa.

7. The method of production of a multilayer ceramic electronic device as set forth in claim 1, wherein a dielectric layer paste having a main ingredient material including a dielectric oxide of a composition of $\{(Sr_{1-x}Ca_x)O\}_m \cdot (Ti_{1-y}Zr_y)O_2$ where $0 \leq x \leq 1.00$, $0 \leq y \leq 1.00$, and $0.75 \leq m \leq 1.3$, and a secondary ingredient material including Mn is used.

8. A method of production of a multilayer ceramic electronic device comprising a firing step of firing a stack comprised of a dielectric layer paste and an internal electrode layer paste including a base metal alternately arranged in a plurality of layers, a first annealing step of annealing, at a temperature T1 of 600 to 900° C., the stack after firing and a second annealing step of annealing, at a temperature T2 of 900 to 1200° C. (however, excluding 900° C.), the stack after said first annealing.

9. The method of production of a multilayer ceramic electronic device as set forth in claim 8, wherein the difference (T2−T1) between T2 and T1 is at least 50° C.

10. The method of production of a multilayer ceramic electronic device as set forth in claim 8, wherein an atmospheric temperature of a temperature reducing process of the firing step where the atmospheric temperature is lowered from the firing holding temperature is lowered to a temperature the same as the temperature T1, the first annealing step is performed, then the second annealing step is performed.

11. The method of production of a multilayer ceramic electronic device as set forth in claim 8, wherein an atmospheric temperature of a temperature reducing process of the firing step where the atmospheric temperature is lowered from the firing holding temperature is lowered to a temperature lower than said temperature T1 and higher than room temperature, then the atmospheric temperature is raised, the first annealing step is performed, then the second annealing step is performed.

12. The method of production of a multilayer ceramic electronic device as set forth in claim 8, wherein after a temperature lowering step of the firing step where an atmospheric temperature is lowered from a firing holding temperature, the atmospheric temperature is raised, the first annealing step is performed, then the second annealing step is performed.

13. The method of production of a multilayer ceramic electronic device as set forth in claim 8, wherein the first annealing step is performed at an oxygen partial pressure of $10^{-7}$ to 0.1 Pa and the second annealing step is performed at an oxygen partial pressure of $10^{-5}$ to 10 Pa.

14. The method of production of a multilayer ceramic electronic device as set forth in claim 8, wherein a dielectric layer paste having a main ingredient material including a dielectric oxide of a composition of $\{(Sr_{1-x}Ca_x)O\}_m \cdot (Ti_{1-y}Zr_y)O_2$, where $0 \leq x \leq 1.00$, $0 \leq y \leq 1.00$, and $0.75 \leq m \leq 1.3$, and a secondary ingredient material including Mn is used.

* * * * *